Patented Sept. 12, 1944

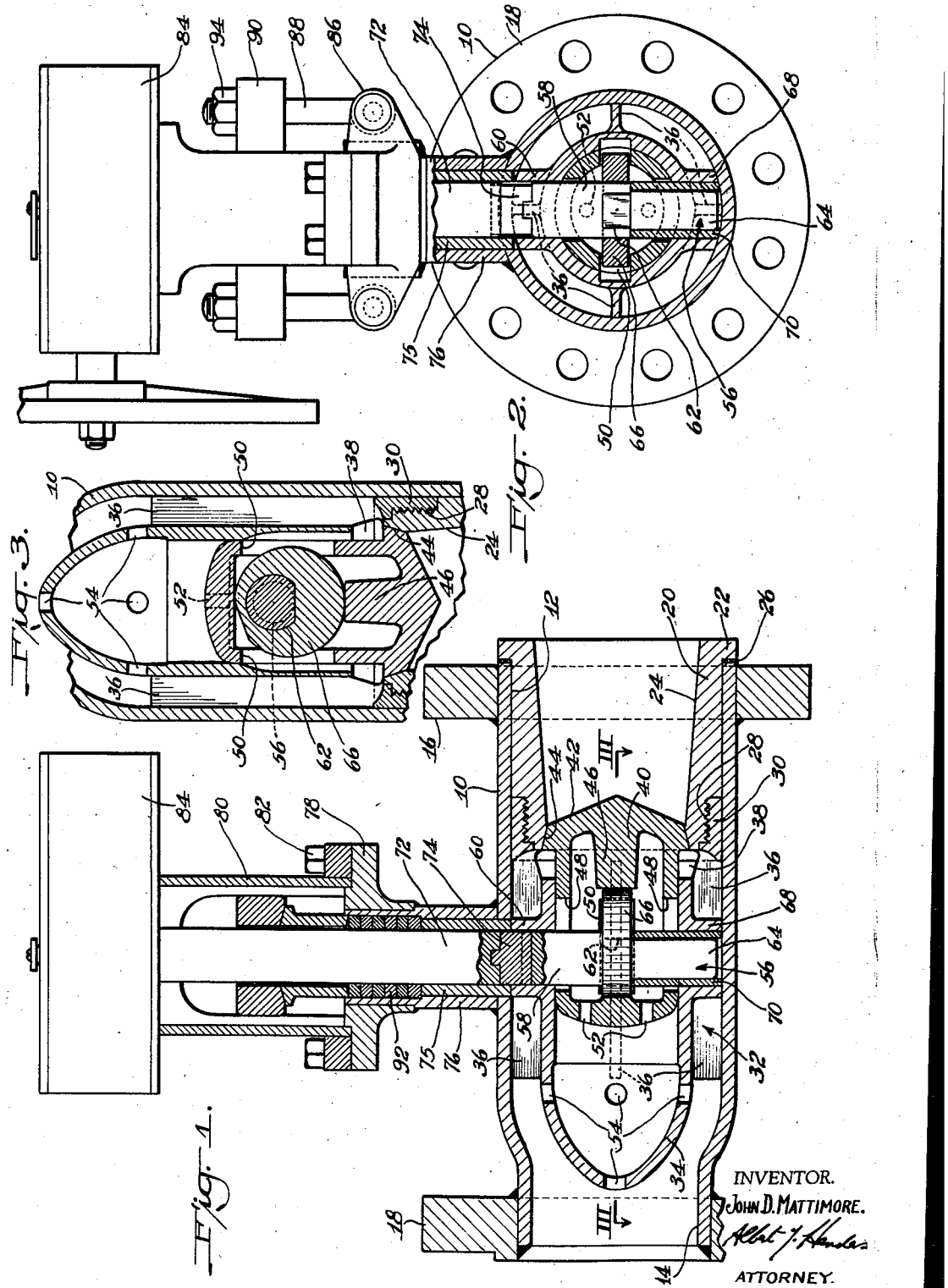

2,357,965

UNITED STATES PATENT OFFICE 2,357,965

VALVE

John D. Mattimore, Greensburg, Pa., assignor to Walworth Patents Inc., Boston, Mass., a corporation of Massachusetts Application August 13, 1942, Serial No. 454,631

4 Claims. (Cl. 251—40)

This invention relates to valves and more particularly to the reciprocating plug type valve of streamlined form disclosed in Patent No. 2,283,076.

In applying the teachings of the aforementioned patent to larger size valves, various difficulties were encountered. The assembly of the parts when of increased size and weight was found to be awkward and dismantling operations apt to be prolonged. The unbalanced nature of the reciprocating valve member tended to interfere with ease of operation and its weight not only added to this difficulty but limited the field of application of the device. It is, therefore, an object of this invention to eliminate these difficulties and render the valve applicable for use in large size pipe lines while retaining the advantages of the general form disclosed in the aforesaid patent.

Other objects and advantages will become apparent from the following description taken in connection with the accompanying drawing wherein:

Fig. I is a front elevation partly in section of a valve embodying the invention;

Fig. II is an end elevation partly in section of the valve shown in Fig. I, and

Fig. III is a section taken on the line 3—3 of Fig. I.

Referring more particularly to the drawing, the valve includes a tubular body portion 10 having a smooth bore providing an inlet opening 12 at one end and an outlet opening 14 at the other. The body 10 is preferably formed from a length of seamless drawn metal tubing of larger internal diameter than the pipe line in which it is adapted to be installed and the outlet end 14 is accordingly swaged or otherwise reduced to substantially the same diameter as the pipe line. The portion of the bore between the inlet and the outlet openings defines a flow passage through the valve and flanges 16 and 18 may be secured by welding adjacent the inlet and outlet openings respectively, for securing the valve in the pipe line. It will be understood that the terminal ends of the body 10 may be threaded or provided with bevels for welding should these other conventional means of connection to the pipe line be desired.

The inlet end 12, which as stated is of larger diameter than the bore of the pipe line, is provided with a tubular valve seat member 20 having a head 22 of substantially the same diameter as the outer diameter of the body 10 and positioned exterior of the body. The bore 24 of the valve seat member 20 is preferably tapered with the larger end thereof located adjacent the head 22 and being of substantially the same diameter as the inner diameter of the pipe line. The valve seat member 20 fits closely within the inlet opening 12 of the body 10 and a gasket 26 may be provided between the adjacent faces of the head 22 and the body 10 to prevent leakage at this point.

The inner end of the valve seat member 20 is provided with a reduced threaded portion 28 spaced from the inner wall of the body 10 and adapted for engagement with a threaded annular portion 30 formed on one end of a hollow guide member, designated generally by the reference numeral 32. The guide member 32 is in the form of a shell 34 having a closed end of streamlined form and is spaced from the inner wall of the body 10 to form an annular flow area in the flow passage beyond the valve seat member 20. The shell portion 34 of the guide member 32 is connected by a plurality of fins 36 to the projection portion 30 and the fins extend laterally from the shell portion 34 along the length thereof in engagement with the inner wall of the body 10 and terminate adjacent the streamlined end 34. In this instance four such fins 36 are shown but it will be understood that any desired number may be provided. As the end of the shell portion 34 adjacent the projection 30 is connected thereto only by the fins 36 an annular port 38, interrupted only by the fins 36, is provided at this point. The port 38 affords communication between the portion of the flow passage defined by the tapered bore 24 of the valve seat member 20 and the annular flow area defined by the spaced arrangement of the guide member 32 and the interior wall of the body 10.

A valve member 40 is slidably mounted in the guide member 32 and is provided with a head 42 which cooperates with a seat 44 formed on the inner end of the valve seat member 20 to control flow of fluid through the port 38. The valve member 40 is hollow and has an internal projection 46 extending axially from the head 42 into the bore thereof. Communication with the interior of the hollow valve member 42 is afforded by the provision of a pair of spaced openings 48 located diametrically opposite each other, there being a second pair of openings 50 located substantially perpendicular to the openings 48. In order to prevent entrapment of fluid within the hollow valve member 40, the end opposite the head 42 may be provided with a plurality of perforations 52 affording access to the interior of the guide member 32. The streamlined end 34 of the guide member 32 may likewise be provided with a plurality of perforations 54 for similar purpose.

The operating means for reciprocating the valve member 40 into and out of engagement with its seat 44 may comprise, in this instance, a valve stem of sectional form for a purpose to be described hereinafter. One portion 56 of the valve stem is carried wholly within the guide member 32 and may comprise an upper portion 58, an intermediate portion 62 and a lower portion 64. The upper portion 58 is rotatably mounted in a hollow boss 60 projecting from the shell portion 34 of the guide member intermediate its ends. The intermediate portion 62 is non-circular and carries a cam element 66 having a complementary non-circular opening therein to prevent relative rotation. The lower portion 64 of the valve stem 56 is reduced in diameter to permit assembly of the cam element on the stem. The lower end 64 of the valve stem extends through the side of the guide member 32, there being a similar hollow boss 68 diametrically opposite the boss 60 but provided with a bushing 70 to accommodate the reduced size of this portion of the stem.

The cam element 66 is adapted to engage the projection 46 on the interior of the valve element 40 and is maintained in position on the stem by engagement with one end of the bushing 70 which has its opposite end supported on the inner wall of the body 10. The upper portion 58 does not project to the outer end of the boss 60 but terminates within the interior thereof. The valve stem is this embodiment also includes an outer portion 72 which extends beyond the body 10 from within one portion of the wall thereof and has its inner end connected by a separable form of coupling to the upper portion 58 of the valve stem 56. In this instance, the adjacent ends of the valve stems 56 and 72 are suitably slotted for engagement with an Oldham coupling 74 which is mounted therebetween and supported for rotation partly within the boss 60. The wall of the body 10 surmounting the boss 60 is suitably bored for the reception of a sleeve 75 within which the valve stem 72 and the remaining portion of the coupling 74 are rotatably mounted. The sleeve 75 is slidably mounted in a bonnet 76 of tubular form secured by welding to the body 10. A support 78 in the form of a welding neck flange is carried on the upper end of the bonnet 76 and may be secured thereto by welding. The support 78 carries a flanged yoke 80 secured thereto by means of the bolts 82 and serving to support a housing 84 within which the valve operating mechanism is carried in operative engagement with the valve stem 72. The support 78 is provided with projections 86 extending from opposite sides thereof and carrying bolts 88 engaging with a suitable packing gland 90. The packing gland is adapted to compress packing 92 around the stem 72 when pressure is applied to the gland by means of the nuts 94 carried by the bolts 88.

In the operation of the device it will be apparent that when the valve structure is connected in a pipe line the rotation of valve stem 72 by the operating mechanism will serve to rotate valve stem 58 through the medium of the coupling 74 causing the cam 66 to actuate the valve member 42 toward and away from its seat within the flow passage. The passage of fluid from the pipe at the inlet end to that at the outlet end is obstructed to a minimum extent by the valve member and its operating means within the valve body. Consequently, a streamlined flow without undue turbulence or eddy currents results. The change in velocity of the fluid lessened by use of the construction and the pressure drop is reduced.

In addition to these advantages the assembly and dismantling of the valve is facilitated. The sectional valve stem not only serves as an operating means but also retains the operating parts in position in the valve body. It will be apparent that by merely withdrawing the stem 72 and raising the coupling 74 within the sleeve 75 the entire insides of the valve structure comprising the valve seat 20, guide member 32 and valve member 40 together with the valve stem 56 cam be withdrawn from the inlet end of the valve body. Similarly, by merely replacing these parts in position in the body and engaging the coupling 74 and the valve stem 72 the valve is again ready for use. It will be understood that many changes may be made in the details of construction and arrangement of the parts without departing from the spirit of the invention as set forth in the appended claims.

I claim:

1. A valve, comprising a tubular body portion providing an inlet and an outlet at opposite ends and having a flow passage extending through the body therebetween, a valve seat member projecting into the inlet end of said body, a hollow guide member in said body having an open end secured to said valve seat and terminating adjacent said outlet in a substantially closed end, said guide member being spaced from the wall of said tubular body portion for defining an annular flow area in said flow passage beyond said valve seat, a valve member reciprocable in said hollow guide member and cooperable with said seat, a port in said guide member affording communication between the inlet end portion of said flow passage and said flow area when said valve member is disengaged from its seat, and a valve stem projecting from intermediate the ends of said valve member through said guide member and exteriorly of said body for reciprocating the valve member axially of the passage into and out of engagement with said seat.

2. A valve, comprising a tubular body portion providing an inlet and an outlet at opposite ends and having a flow passage extending through the body therebetween, a valve seat member projecting into the inlet end of said body, a hollow guide member in said body having an open end secured to said valve seat and terminating adjacent said outlet in a substantially closed end of streamlined form, said guide member being spaced from the wall of said tubular body portion for defining an annular flow area in said flow passage beyond said valve seat, a cylindrical valve member slidably mounted in said guide member and having an imperforate head projecting therebeyond for engagement with the valve seat, a port in said guide member affording communication between the inlet end portion of said flow passage and said flow area when said valve member is disengaged from said seat, and a valve stem projecting through said body and extending transversely through said guide and valve members intermediate the ends thereof for reciprocating the valve member axially of the passage into and out of engagement with said seat.

3. A valve, comprising a tubular body portion providing an inlet and an outlet at opposite ends and having a flow passage extending through the body therebetween, a tubular valve seat projecting into one end of said body and slidably engaging the inner wall thereof, a hollow guide member extending from said valve seat toward the opposite end of said body having an open end secured to said valve seat, said guide being spaced from said inner wall of said body, a cylindrical valve member slidably mounted in said guide adjacent the valve seat, said guide having a port affording communication between the said one end and said space when the valve is disengaged from its seat, a separable valve stem secured for axial rotation in said body and extending transversely through said guide and valve members and projecting from said body, said stem thereby retaining said guide and valve seat in fixed position in said body and having operative engagement with said valve member for reciprocating said valve member along the axis of said guide into and out of engagement with said valve seat, and means for connecting said valve stem together within the boundary of said flow passage to permit association of one portion thereof with the guide member and valve seat for withdrawal as a unit from said one end of the body.

4. A valve, comprising a tubular body portion providing an inlet and an outlet at opposite ends and having a flow passage extending through the body therebetween, a tubular valve seat projecting into and slidably engaging the inlet end of said body, a hollow guide member in said body intermediate the inlet and outlet having an open end secured to said valve seat, a plurality of fins extending longitudinally between said guide member and the inner wall of said body for supporting said guide member in slidable relation therein, said guide member being thereby spaced from said inner wall and defining an annular flow area in said flow passage beyond the valve seat, a cylindrical valve member slidably mounted in said guide member adjacent the valve seat, said guide having a port affording communication between the inlet end portion of said flow passage and said flow area when the valve member is disengaged from its seat, a separable valve stem secured for axial rotation in said body and extending transversely through said guide and valve members and projecting from one side of said body, said stem thereby retaining said guide and valve seat in fixed position in said body, means operable between said stem and valve member to reciprocate the latter into and out of engagement with the seat along the axis of said flow passage upon said rotation of said stem, and means for coupling the separable portions of said valve stem together within the boundary of said flow passage to permit that portion carrying said operable means to be withdrawn as a unit with said guide and valve seat through the inlet end of said body.

JOHN D. MATTIMORE.